United States Patent [19]
Bendell

[11] 4,223,253
[45] Sep. 16, 1980

[54] FOCUSING SYSTEM FOR COLOR TV CAMERA

[75] Inventor: Sidney L. Bendell, Riverton, N.J.

[73] Assignee: RCA Corporation, New York, N.Y.

[21] Appl. No.: 970,805

[22] Filed: Dec. 18, 1978

[30] Foreign Application Priority Data

Mar. 21, 1978 [GB] United Kingdom ............. 11197/78

[51] Int. Cl.³ .................................................. H01J 29/58
[52] U.S. Cl. ...................................... 315/382; 315/9; 315/31 TV
[58] Field of Search .................. 315/31 R, 31 TV, 382, 315/8.6, 9; 335/213; 250/396 ML

[56] References Cited

U.S. PATENT DOCUMENTS

| | | |
|---|---|---|
| 2,994,803 | 8/1961 | Goldberg ............ 315/31 TV |
| 3,564,330 | 2/1971 | Pfeiffer ..................... 315/10 |
| 3,586,902 | 6/1971 | Siegel ......................... 315/9 |
| 3,896,339 | 7/1975 | Efimov et al. ............ 315/382 |
| 3,961,219 | 7/1976 | Bechteler et al. ........ 335/213 |

*Primary Examiner*—Theodore M. Blum
*Attorney, Agent, or Firm*—Eugene M. Whitacre; Paul J. Rasmussen; Robert L. Troike

[57] ABSTRACT

The focusing system for a multi-pickup tube color television camera includes a main focus coil and a vernier focus coil about each pickup tube. The main focus coils are coupled in series to a common source and the vernier focus coils are independently controllable.

4 Claims, 2 Drawing Figures

FOCUSING SYSTEM FOR COLOR TV CAMERA

BACKGROUND OF THE INVENTION

In multi-pickup tube color TV cameras utilizing magnetically focused pickup tubes, it is essential for registration reasons to maintain precise control of several associated pickup tube parameters. These include: focus coil mechanical configuration, focus coil current, and G-3/G-4 voltage ratio of each pickup tube where G-3 represents the focus cylinder voltage and G-4 represents the field mesh voltage. To do all of these in a cost effective fashion is the concern of the subject invention.

Each pickup tube in a multi-pickup tube camera system contains a focus cylinder (G-3) and a field mesh (G-4). The ratio of the voltages applied to these two electrodes affects tube performance characteristics such as beam landing error, center-to-corner focus, and geometry of the reproduced image. Electronic focusing of the pickup tube scanning beam may be achieved by either: (a) adjusting the G-3 and G-4 voltages in concert such as to retain a constant ratio; or (b) adjusting the focus coil current. It is desirable to provide remote focusing control of the camera by a digital control system using microprocessors. The G-3/G-4 voltages are of the order of 1,000 volts and the precision required is such as to make it impractical to derive these digital signals from a low voltage control such as associated with a digital control system. The focusing of each tube may be accomplished by individual current control for each focus coil. A disadvantage of this type of system is that there can exist differential shifts in the focus coil currents resulting in registration errors.

SUMMARY OF THE INVENTION

According to the present invention the above problems are eliminated by the bulk of the focus field for each tube being supplied by three main focus coils, all of which are connected in series to a common regulated current supply. An adjustable component for focusing each coil tube system is supplied by separate vernier focus coils included in each yoke/focus coil assembly.

DESCRIPTION OF A PREFERRED EMBODIMENT

As mentioned in the background, a digital control system such as an eight-bit binary code produces 256 levels of control voltages, for example. In a typical system the maximum voltage level is 5 volts ($-5$ to $+5$ volts). As mentioned previously, to do electronic focusing would require a scaling upward from this 5 volts maximum to voltages on the order of 1,000 volts. The precision required of the G-3/G-4 voltages is approximately 0.1%. Such large upward voltage scalings are subject to inaccuracies and therefore when such precision is required such an arrangement is impractical.

In another arrangement the focusing of each tube is accomplished by the individual current control for each focus coil. An advantage to this system is that the control means for each of the relatively low voltage focus coil controls is readily compatible with the low voltage digital control system output; so no large upward voltage scaling with its associated inaccuracies is required. A disadvantage of this system is that there can exist differential shifts in focus coil currents resulting in registration errors since the three color tubes are not correlated.

Figure 1:
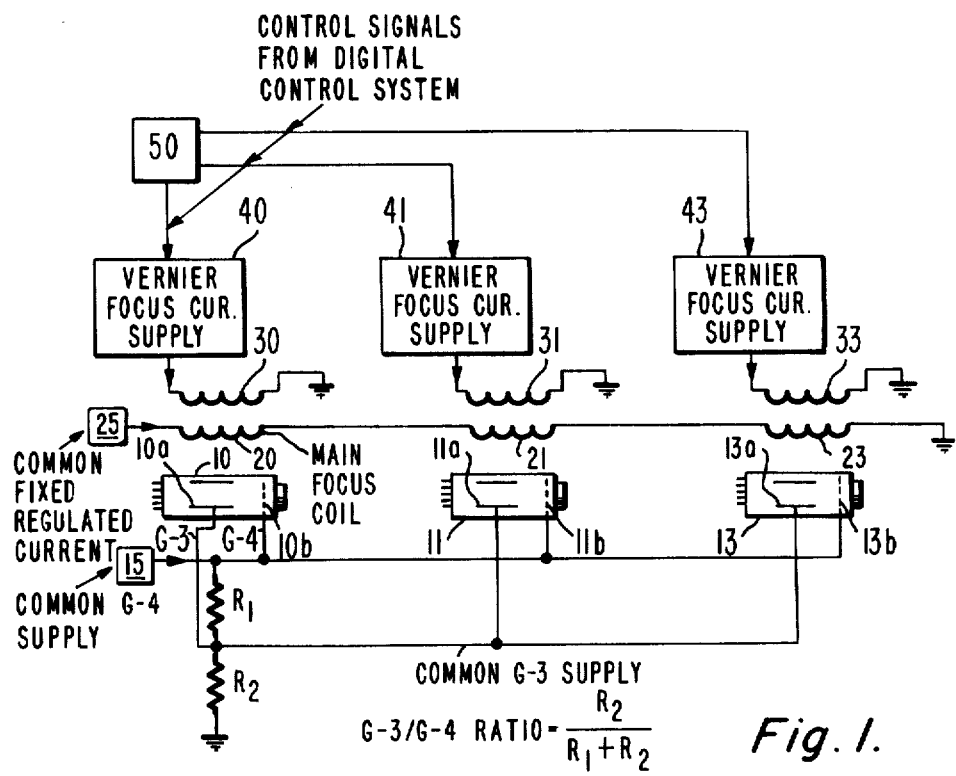
FIG. 1 illustrates the focus coil system for the camera according to the present invention.

The present invention relates to a focusing system which tends to greatly or entirely eliminate the disadvantages of the two aforementioned methods. Referring to FIG. 1, there is illustrated a compound focus coil system. In the sketch of FIG. 1 there is illustrated the red tube 10, the green tube 11, and the blue tube 13. Also illustrated is the focus cylinder and the field mesh electrode for each of these pickup tubes. The focus cylinder for tube 10 is 10a and the field mesh electrode for tube 10 is 10b. Similarly, the focus cylinder for tube 11 is 11a and the field mesh electrode is 11b. Similarly, the focus cylinder for tube 13 is 13a and the field mesh electrode is 13b. A common voltage supply (G-4) 15 for the field mesh electrodes 10b, 11b, and 13b is provided. This voltage supply is applied directly in parallel to the mesh electrodes. The supply from source 15 is applied in parallel via a tap between resistors $R_1$ and $R_2$ of this resistor divider network to the focus cylinder electrodes of 10a, 11a, and 13a. The ratio of voltages G-3/G-4 is a function of the ratio of resistors $R_1$ and $R_2$. This ratio of resistors $R_1$ and $R_2$ is selected to provide a desired G-3 to G-4 ratio discussed previously which affects tube performance characteristics such as beam landing error, center-to-corner focus, and the geometry of the reproduced image. The voltages provided are on the order of approximately 700 volts to focus cylinder and 1,000 volts to the field mesh electrode. The focus field for the tubes is provided by focus coils associated with the yoke assembly. A focus coil represented schematically in FIG. 1 by coil 20 is mounted in the yoke assembly about the tube 10. Similarly, focus coil 21 is mounted about the tube 11 and focus coil 23 is mounted about the tube 13. In accordance with the present invention, these focus coils 20, 21, and 23 are coupled in series to a common fixed regulated current source 25. In accordance with the teaching herein the bulk of the focus fields for each tube is supplied by the associated one of three series connected main focus coils (20, 21, or 23) which are connected in series to a common regulated fixed current supply 25. By the term "bulk" it is meant that, for example, approximately 95% of the total focus field is provided via these three main focus coils 20, 21, and 23 which are connected in series. In addition there are three separate vernier focus coils—one in each yoke focus coil assembly. This is represented schematically in FIG. 1 by coils 30, 31, and 33. These vernier focus coils are coupled to independent vernier focus current supplies 40, 41, and 43. The coil 30 is coupled between this vernier supply 40 and ground or reference potential. The coil 31 is coupled between the green focus current supply 41 and ground and the coil 33 is coupled between the vernier focus current supply 43 and ground. A red vernier control signal from a digital control system 50 is applied to the vernier focus current supply 40. The digital signal to the vernier focus current supply 40 is for example in the form of an eight-bit digital code representing one of 256 levels which are detected and converted in the vernier focus current supply 40 to provide an analog current level corresponding to that binary digital control signal. Similarly, a separate eight-bit code signal from control system 50 is applied to the green vernier focus supply 41 and a separate eight-bit code signal from control system 50 is applied to the blue vernier focus supply 43. This digital control system 50 may be located at operator or camera setup unit location. The digital control system includes for example three analog to digital converters which are responsive to three separate voltage values set by the potentiometers settings to provide the eight-bit digital code signals. At each of the vernier focus supplies 40, 41, or 43 there may be for example a digital to analog converter where the eight-bit code is converted to an analog level representing the code which is applied to directly to the coils in the form of a current level or converter through some scaler quantity for the appropriate current level to be applied to the vernier controls.

Since 95% (percent) of the focus field of each red, green, and blue is supplied by a common bias supply 25 (the main focus coils being connected in series) the differential drift in an individual focus field of the pickup tubes is reduced to zero as far as the main fields are concerned. The vernier fields can drift relative to each other; however, since they contribute such a small amount of the total required focus field, the total stability problem is considerably reduced. The small number of turns associated with the vernier coils results in a low impedance coil which can be readily driven by a low level signal from a digital control system 50.

Figure 2:
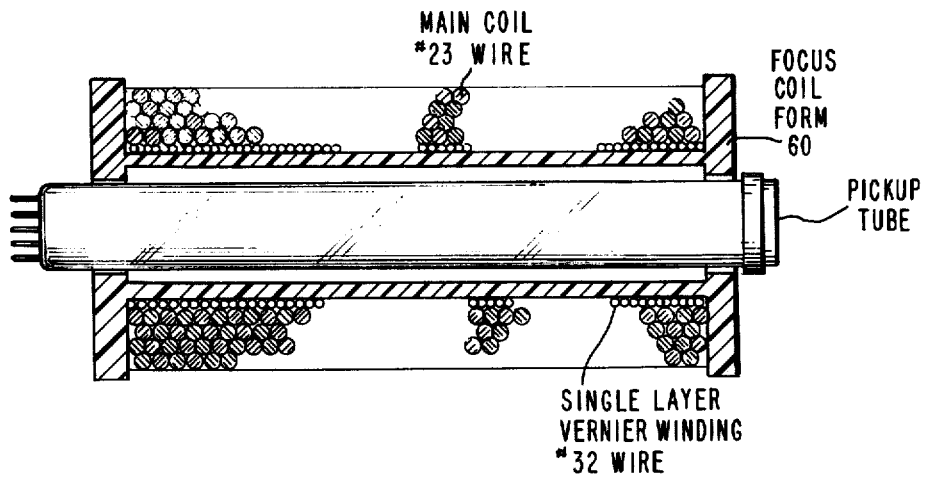
FIG. 2 is a sketch of a focus coil system for a single tube.

Referring to FIG. 2, there is illustrated a cross-sectional sketch of a tube and yoke assembly for each of the tubes in FIG. 1. The vernier coil (such as 30, 31, or 33 in FIG. 1) is formed by a single layer of fine wire, (for example #32 wire) that is wound by an automatic coil winder directly on the inner surface of a focus coil form 60 in the general shape of a spool of dielective material. The single layer can be laid precisely and forms an exact cylinder upon which to wind the main or bulk focus coil. The main or bulk focus coil (for example coils 20, 21, or 22 in FIG. 1) comprises, for example, six layers of relatively large diameter (No. 23 wire, for example) wound directly upon the vernier coil and fills the remainder and the bulk of the total winding volume. The large wire size, resulting a relatively few layers and relatively few turns per layer, achieves a winding configuration which facilitates precision winding using available automatic winding machines. The advantage of using large size wire to wind a focus coil is extremely important for achieving high winding precision. A non-compound large wire size coil (low impedance) alone, however, would not achieve the goals of precision wiring and simple-to-implement vernier focus control with high attendant stability. The system described above with vernier and main focus coils has the additional advantage described above that achieves high precision at a low manufacturing cost.

By the term "bulk" as used herein it is intended to include other percentages than 95% and is intended to include percentages to indicate that the greater part of the focus field is associated with coils 20, 21, and 23. This greater part is such a percentage that the differential shifts in the focus currents in the vernier coils have negligible effects.

What is claimed is:

1. A focusing system for color television camera having a plurality of image pickup tubes wherein associated with each tube is a yoke assembly, comprising:
    a plurality of main focus coils with a main focus coil mounted on the yoke assembly about each pickup tube, said main focus coils being connected in series to a common regulated current supply, each of said main focus coils providing the bulk of the focus field for each pickup tube,
    a plurality of separate vernier focus coils with a separate vernier focus coil mounted on the yoke assembly about each image pickup tube and means for applying to each vernier coil a separate low power, low voltage adjustable current whereby only a small amount of the total required focus field is provided via the vernier fields so that electronic focusing may be provided using a low voltage source without the stability problems.

2. The combination claimed in claim 1 wherein the separate vernier focus coils are wound directly on the inner surface of the yoke assembly and the main focus coil is wound directly upon the vernier coil.

3. The combination claimed in claim 1 wherein said vernier coil is a single layer of fine wire and the main coil comprises several layers of relatively large diameter wire.

4. The combination claimed in claim 1 wherein said tubes each have a focus cylinder electrode and a field mesh electrode and means for applying biasing voltages to said electrodes such that the ratio of the focus cylinder and field mesh voltages are maintained constant.

* * * * *